United States Patent
Vellanki et al.

(10) Patent No.: US 10,514,614 B2
(45) Date of Patent: Dec. 24, 2019

(54) PROCESS VARIABILITY AWARE ADAPTIVE INSPECTION AND METROLOGY

(71) Applicant: ASML Netherlands B.V., Veldhoven (NL)

(72) Inventors: Venugopal Vellanki, San Jose, CA (US); Vivek Kumar Jain, Milpitas, CA (US); Stefan Hunsche, Santa Clara, CA (US)

(73) Assignee: ASML Netherlands B.V., Veldhoven (NL)

( * ) Notice: Subject to any disclaimer, the term of this patent is extended or adjusted under 35 U.S.C. 154(b) by 75 days.

(21) Appl. No.: 15/546,592

(22) PCT Filed: Jan. 20, 2016

(86) PCT No.: PCT/EP2016/051073
§ 371 (c)(1),
(2) Date: Jul. 26, 2017

(87) PCT Pub. No.: WO2016/128189
PCT Pub. Date: Aug. 18, 2016

(65) Prior Publication Data
US 2018/0031981 A1 Feb. 1, 2018

Related U.S. Application Data

(60) Provisional application No. 62/116,256, filed on Feb. 13, 2015, provisional application No. 62/117,261, filed on Feb. 17, 2015.

(51) Int. Cl.
*G06F 17/50* (2006.01)
*G03F 7/00* (2006.01)
(Continued)

(52) U.S. Cl.
CPC .............. *G03F 7/7065* (2013.01); *G03F 1/60* (2013.01); *G03F 1/84* (2013.01); *G03F 7/705* (2013.01);
(Continued)

(58) Field of Classification Search
CPC ............. G06F 17/5009; G06F 17/5081; G06F 2217/12; G03F 7/7065; G03F 7/705;
(Continued)

(56) References Cited

U.S. PATENT DOCUMENTS

| | | |
|---|---|---|
| 5,229,872 A | 7/1993 | Mumola |
| 5,296,891 A | 3/1994 | Vogt et al. |

(Continued)

FOREIGN PATENT DOCUMENTS

| | | |
|---|---|---|
| TW | 1628696 | 7/2018 |
| WO | 2013179956 | 12/2013 |

OTHER PUBLICATIONS

International Search Report and Written Opinion dated Jun. 8, 2016 in corresponding International Patent Application No. PCT/EP2016/051073.

(Continued)

*Primary Examiner* — Phallaka Kik
(74) *Attorney, Agent, or Firm* — Pillsbury Winthrop Shaw Pittman LLP

(57) ABSTRACT

A defect prediction method for a device manufacturing process involving processing one or more patterns onto a substrate, the method including: determining values of one or more processing parameters under which the one or more patterns are processed; and determining or predicting, using the values of the one or more processing parameters, an existence, a probability of existence, a characteristic, and/or a combination selected from the foregoing, of a defect resulting from production of the one or more patterns with the device manufacturing process.

20 Claims, 11 Drawing Sheets

(51) Int. Cl.
*G03F 1/60* (2012.01)
*G03F 1/84* (2012.01)
*G06N 20/00* (2019.01)
*G03F 7/20* (2006.01)

(52) U.S. Cl.
CPC ...... *G03F 7/70525* (2013.01); *G03F 7/70641* (2013.01); *G03F 7/70666* (2013.01); *G06F 17/5081* (2013.01); *G06N 20/00* (2019.01); *G06F 17/5009* (2013.01); *G06F 2217/12* (2013.01)

(58) Field of Classification Search
CPC ............. G03F 7/70525; G03F 7/70641; G03F 7/70666; G03F 1/60; G03F 1/84; G06N 20/00
USPC ........ 716/52, 54, 56, 112, 136; 700/97, 110, 700/119, 120
See application file for complete search history.

(56) References Cited

U.S. PATENT DOCUMENTS

| | | | |
|---|---|---|---|
| 5,523,193 A | 6/1996 | Nelson | |
| 5,539,652 A * | 7/1996 | Tegethoff | G01R 31/2846 700/108 |
| 5,969,441 A | 10/1999 | Loopstra et al. | |
| 6,046,792 A | 4/2000 | Van Der Werf et al. | |
| 6,169,960 B1 * | 1/2001 | Ehrichs | H01L 22/20 257/E21.525 |
| 6,918,101 B1 * | 7/2005 | Satya | G06F 17/5081 716/112 |
| 6,948,141 B1 * | 9/2005 | Satya | G01R 31/318364 716/136 |
| 6,999,164 B2 * | 2/2006 | Hasan | G01N 21/9501 356/237.4 |
| 8,200,468 B2 | 6/2012 | Ye et al. | |
| 9,990,462 B2 * | 6/2018 | Fouquet | G06F 17/5081 |
| 2006/0053357 A1 * | 3/2006 | Rajski | G01R 31/01 714/742 |
| 2006/0069958 A1 * | 3/2006 | Sawicki | G01R 31/318357 714/33 |
| 2007/0011647 A1 * | 1/2007 | Abrams | G03F 1/36 716/54 |
| 2007/0048635 A1 * | 3/2007 | Schulze | G03F 7/70525 430/30 |
| 2007/0184357 A1 * | 8/2007 | Abrams | G03F 1/36 430/5 |
| 2007/0186206 A1 * | 8/2007 | Abrams | G03F 1/36 716/52 |
| 2007/0288219 A1 * | 12/2007 | Zafar | G03F 1/84 703/14 |
| 2008/0256504 A1 * | 10/2008 | Oishi | G03F 1/144 716/55 |
| 2009/0157360 A1 | 6/2009 | Ye et al. | |
| 2009/0274981 A1 * | 11/2009 | Griebenow | G01N 21/956 430/322 |
| 2010/0249974 A1 * | 9/2010 | Fei | G05B 21/02 700/105 |
| 2012/0330591 A1 * | 12/2012 | Chu | G06F 19/00 702/81 |
| 2015/0227654 A1 * | 8/2015 | Hunsche | G06F 17/5009 716/54 |
| 2015/0241511 A1 * | 8/2015 | Bickford | H01L 22/10 702/117 |
| 2015/0356233 A1 * | 12/2015 | Fouquet | G06F 17/5081 438/5 |
| 2016/0085905 A1 * | 3/2016 | Chen | G06F 17/5081 716/52 |
| 2016/0150191 A1 * | 5/2016 | Karsenti | H04N 7/181 382/149 |
| 2016/0217233 A1 * | 7/2016 | Kamon | G06F 17/5068 |
| 2016/0313651 A1 * | 10/2016 | Middlebrooks | G03F 7/705 |
| 2017/0023863 A1 * | 1/2017 | Bou-Ghazale | G11C 5/025 |
| 2018/0365369 A1 * | 12/2018 | Fouquet | G06N 7/005 |

OTHER PUBLICATIONS

Disclosed Anonymously, "Defect Prediction," Research Disclosure, Database No. 604033, pp. 1-7 (Aug. 2014).
Taiwanese Office Action issued in corresponding Taiwanese Patent Application No. 105102573, dated Oct. 29, 2018.

* cited by examiner

PROCESS VARIABILITY AWARE ADAPTIVE INSPECTION AND METROLOGY

This application is the U.S. national phase entry of PCT patent application no. PCT/EP2016/051073, filed Jan. 20, 2016, which claims the benefit of priority of U.S. Provisional Patent Application No. 62/116,256, filed Feb. 13, 2015 and U.S. Provisional Application No. 62/117,261, filed Feb. 17, 2015, which are incorporated by reference herein in their entireties.

TECHNICAL FIELD

The present description relates to a method of adjusting the performance of a semiconductor manufacturing process. The method may be used in connection with a lithographic apparatus.

BACKGROUND

A lithographic apparatus can be used, for example, in the manufacture of integrated circuits (ICs). In such a case, a patterning device (e.g., a mask) may contain or provide a circuit pattern corresponding to an individual layer of the IC ("design layout"), and this circuit pattern can be transferred onto a target portion (e.g. comprising one or more dies) on a substrate (e.g., silicon wafer) that has been coated with a layer of radiation-sensitive material ("resist"), by methods such as irradiating the target portion through the circuit pattern on the patterning device. In general, a single substrate contains a plurality of adjacent target portions to which the circuit pattern is transferred successively by the lithographic apparatus, one target portion at a time. In one type of lithographic apparatuses, the circuit pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the circuit pattern on the patterning device are transferred to one target portion progressively. Since, in general, the lithographic apparatus will have a magnification factor M (generally <1), the speed F at which the substrate is moved will be a factor M times that at which the projection beam scans the patterning device. More information with regard to lithographic devices as described herein can be gleaned, for example, from U.S. Pat. No. 6,046,792, incorporated herein by reference.

The lithographic apparatus may be of a type having two or more tables (e.g., two or more substrate table, a substrate table and a measurement table, two or more patterning device tables, etc.). In such "multiple stage" devices the additional tables may be used in parallel, or preparatory steps may be carried out on one or more tables while one or more other tables are being used for exposures. Twin stage lithographic apparatuses are described, for example, in U.S. Pat. No. 5,969,441, incorporated herein by reference.

Prior to transferring the circuit pattern from the patterning device to the substrate, the substrate may undergo various procedures, such as priming, resist coating and a soft bake. After exposure, the substrate may be subjected to other procedures, such as a post-exposure bake (PEB), development, a hard bake and measurement/inspection of the transferred circuit pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

As noted, lithography is a central step in the manufacturing of ICs, where patterns formed on substrates define functional elements of the ICs, such as microprocessors, memory chips etc. Similar lithographic techniques are also used in the formation of flat panel displays, micro-electro mechanical systems (MEMS) and other devices.

SUMMARY

Disclosed herein is a computer-implemented defect prediction method for a device manufacturing process involving processing one or more patterns onto a substrate, the method comprising: determining values of one or more processing parameters under which the one or more patterns are processed; and determining or predicting, using the values of the one or more processing parameters, existence, probability of existence, a characteristic, and/or a combination selected from the foregoing, of a defect produced from the one or more patterns with the device manufacturing process.

Disclosed herein is a computer-implemented defect prediction method for a device manufacturing process, the method comprising: determining values of one or more processing parameters under which one or more patterns are processed onto an area of a substrate; and determining or predicting, using the values of the one or more processing parameters, existence, probability of existence, a characteristic, and/or a combination selected from the foregoing, of a defect, in the area, resulting from production of the one or more patterns with the device manufacturing process.

Disclosed herein is a computer-implemented defect prediction method for a device manufacturing process involving processing one or more patterns onto a substrate, the method comprising: determining values across the substrate of one or more processing parameters of the device manufacturing process under which one or more patterns are processed onto the substrate, and identifying one or more areas, utilizing the values of the one or more processing parameters, as having, or having increased probability of existence of, a defect resulting from production with the device manufacturing process.

Disclosed herein is a computer-implemented defect prediction method for a device manufacturing process, the method comprising: determining values of one or more processing parameters under which one or more patterns are processed onto an area of a substrate; and determining or predicting, using the values of the one or more processing parameters, a sub-area of the substrate at which a defect exists, or has an increased probability of existing, resulting from production of the one or more patterns with the device manufacturing process.

Disclosed herein is a device for selecting areas to be inspected on a substrate, the device configured to obtain values of one or more processing parameters under which one or more patterns are processed onto an area of the substrate; and the device configured to select an area for inspection, if existence, probability of existence, a characteristic, and/or a combination selected from the foregoing, of a defect in the area resulting from production of the one or more patterns, meets one or more criteria, wherein the existence, probability of existence, characteristic, and/or combination selected from the foregoing, is determined or predicted using the values of the one or more processing parameters.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

Figure 1:
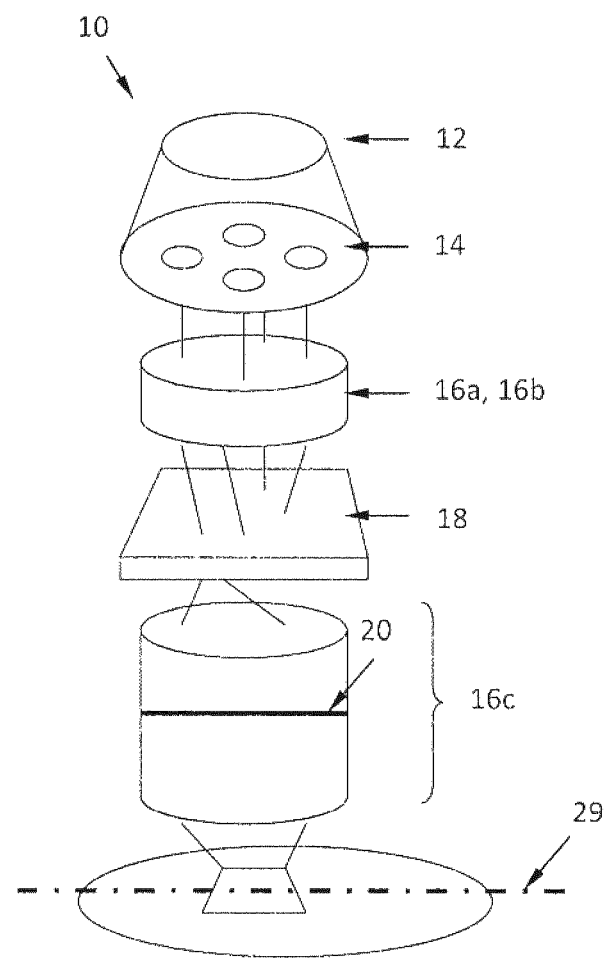
FIG. 1 is a block diagram of various subsystems of a lithography system according to an embodiment.

As a brief introduction, FIG. 1 illustrates an exemplary lithographic apparatus 10. Major components are an illumination source 12, which may be a deep-ultraviolet excimer laser source or other type of sources including extreme ultra violet (EUV) sources, illumination optics which define the partial coherence (denoted as sigma) and which may include optics 14, 16a and 16b that shape radiation from the source 12; a patterning device (e.g., a mask or reticle) 18; and transmission optics 16c that project an image of the patterning device pattern onto a substrate plane 29. An adjustable filter or aperture 20 at the pupil plane of the projection optics may restrict the range of beam angles that impinge on the substrate plane 29, where the largest possible angle defines the numerical aperture of the projection optics NA=sin ($\theta_{max}$).

In a lithographic apparatus, a source provides illumination (i.e. radiation) to a patterning device; projection optics direct and shapes the illumination, via the patterning device, onto a substrate. The term "projection optics" is broadly defined here to include any optical component that may alter the wavefront of the radiation beam. For example, projection optics may include at least some of the components 14, 16a, 16b and 16c. An aerial image (AI) is the radiation intensity distribution on the substrate. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in commonly assigned U.S. Patent Application Publication No. US 2009-0157360,the disclosure of which is hereby incorporated by reference in its entirety. The resist model is related only to properties of the resist layer (e.g., effects of chemical processes which occur during exposure, PEB and development). Optical properties of the lithographic apparatus (e.g., properties of the illumination, the patterning device and the projection optics) dictate the aerial image. Since the patterning device used in the lithographic apparatus can be changed, it is desirable to separate the optical properties of the patterning device from the optical properties of the rest of the lithographic apparatus including at least the illumination and the projection optics.

The term patterning device as employed in this text may be broadly interpreted as referring to generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

- a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The matrix addressing can be performed using suitable electronics. More information on such mirror arrays can be gleaned, for example, from U.S. Pat. Nos. 5,296,891 and 5,523,193, which are incorporated herein by reference.

a programmable LCD array. An example of such a construction is given in U.S. Pat. No. 5,229,872, which is incorporated herein by reference.

Although specific reference may be made in this text to the use of the embodiments in the manufacture of ICs, it should be explicitly understood that the embodiments has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle," "wafer" or "die" in this text should be considered as interchangeable with the more general terms "mask," "substrate" and "target portion," respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5-20 nm).

Various patterns of, or provided by, a patterning device may have different process windows, i.e., a space of processing parameters under which a pattern will be produced within a specification. Examples of pattern specifications (which relate to potential systematic defects) include one or more checks for necking, line pull back, line thinning, critical dimension, edge placement, overlapping, resist top loss, resist undercut and/or bridging. If a pattern is produced outside an applicable specification, it is a defect. The process window of all or some (usually one or more patterns within a particular area) of the patterns of, or provided by, a patterning device may be obtained by merging (e.g., overlapping) the process windows of each of the individual patterns. The process window of these patterns thus may be called an overlapping process window (OPW). The boundary of the OPW contains boundaries of process windows of at least some of the individual patterns. In other words, these individual patterns limit the OPW. These individual patterns can be referred to as "process window limiting patterns (PWLPs)." When controlling a lithography process, it is possible and economical to focus on the PWLPs. When the PWLPs are not defective, it is likely that none of the patterns is defective.

A pattern that is prone to producing a defect may be generally called a pattern of interest (POI). A POI may include one or more PWLPs but is not necessarily limited to one or more PWLPs. For example, a POI may include one or more patterns that are empirically more likely to produce a defect. Such a POI may be identified by subjecting patterns of the design layout to one or more empirical rules. A POI may include one or more patterns that are not a PWLP but whose process window is close to the boundary of the OPW. A POI may include one or more patterns that produced defects in the past (e.g., shown by actual inspection with a metrology tool). A POI may include one or more patterns that have a high or increased probability of producing a defect according to, for example, a statistical model. High probability may include greater than or equal to 10%, greater than or equal to 20%, greater than or equal to 30%, greater than or equal to 40%, greater than or equal to 50%, greater than or equal to 60%, greater than or equal to 70%, greater than or equal to 80%, or greater than or equal to 90% of producing a defect. A POI may include one or more patterns that have certain geometrical traits (e.g., size, shape, relative position to one or more other patterns, etc.).

Once a pattern is identified as a POI, it is desirable to inspect that pattern using a suitable online or off-line metrology tool. However, if the number of POIs is too large, inspecting them will be very time consuming. Therefore, it is beneficial to have a method that can more accurately determine or predict whether a pattern imaged onto a given substrate under a given condition is a defect, thereby reducing the number of POIs to inspect and reducing the time inspection requires. Other than improving the method itself, considering more information may help to improve the accuracy in the determination or prediction. For example, the method may consider the condition (e.g., as manifested as values of one or more processing parameters) under which a pattern is, or will be, processed. The condition may vary with position on a substrate or with time (e.g., between substrates, between dies on a substrate, etc.). Such variation may be caused by change in the environment such as temperature and/or humidity. Other causes of such variation may include drift in one or more components in the processing apparatus such as the illumination system, projection optics, substrate table, height variation of a substrate surface, etc. It would be beneficial to be aware of such variation and its effects on whether a particular pattern will produce a defect. For example, a pattern that is otherwise not likely to produce a defect may do so if it is imaged onto an area of a substrate with abnormal topography (e.g., an elevated area or a recessed area). Of course, a pattern that is very likely to produce a defect might be "saved" if it is imaged onto such an area.

According to an embodiment, a method determines or predicts, using a condition (e.g., as manifested as values of one or more processing parameters) under which a pattern is processed, the existence, probability of existence, a characteristic, and/or a combination selected from the foregoing, of a defect produced from the pattern with the device manufacturing process.

Figure 2:
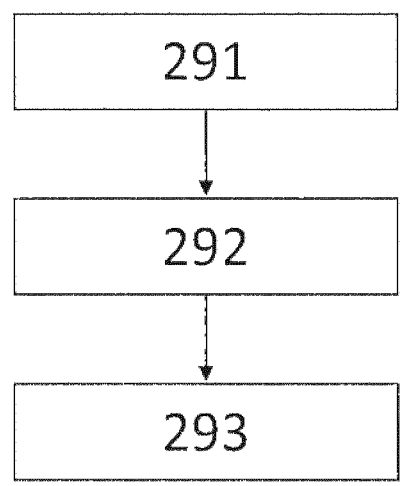
FIG. 2 shows a flow chart for a method that determines or predicts, using a condition (e.g., as manifested as values of one or more processing parameters) under which a pattern is processed, the existence, probability of existence, a characteristic, and/or a combination selected from the foregoing, of a defect produced from the pattern with the device manufacturing process.

FIG. 2 shows a flow chart of an embodiment of this method. In step 291, values of one or more processing parameters under which one or more patterns are processed (e.g., imaged or etched onto a substrate) are determined. In an embodiment, the one or more patterns may be selected exclusively among the PWLPs. In an embodiment, the one or more patterns may be selected among all the patterns. The one or more processing parameters may be local—dependent on the location of the one or more patterns, the die, or both. The one or more processing parameters may be global—independent of the location of the one or more patterns and the dies. One exemplary way to determine the one or more processing parameters is to determine the status of the lithographic apparatus. For example, one or more processing parameters such as laser bandwidth, focus, dose, an illumination shape parameter, a projection optics parameter, etc., and/or spatial or temporal variation of one or more these parameters, may be measured from the lithographic apparatus. Another exemplary way is to infer the one or more processing parameters from data obtained from metrology performed on the substrate, or from an operator of the processing apparatus. For example, metrology may include inspecting a substrate using a diffractive tool (e.g., ASML YieldStar metrology tool), an electron microscope, or other suitable measurement/inspection tool. It is possible to obtain values of the one or more processing parameters for any location on a processed substrate, including the identified POI. In an embodiment, the one or more processing parameters include the depth of focus and/or the focus error (which is the difference between the actual focus to the best focus for a particular pattern). In an embodiment, the focus error may be obtained from multiple sources, such as the lithographic apparatus, on-substrate focus metrology and/or topography measurement of the substrate. Focus error may be attributed to topography of the substrate, drift of the projection optics, drift of the illumination system (such as the radiation source), clamping of the substrate, a substrate-leveling system of the lithographic apparatus, and/or a combination selected from the foregoing. The values of the one or more processing parameters may be compiled into a map—one or more lithographic parameters, or process conditions, as a function of location. Of course, values of one or more other processing parameters may be represented as function of location, i.e., a map. In an embodiment, the values of the processing parameters may be determined before, or desirably immediately before (e.g., no other patterns processed after determining the one or more processing parameters and before the one or more patterns are processed), or during, processing the one or more patterns.

In step 292, existence, probability of existence, a characteristic, and/or a combination selected from the foregoing, of a defect the one or more patterns produce is determined or predicted using the values of the one or more processing parameters under which the one or more patterns are processed. In an embodiment, one or more characteristics of the one or more patterns can also be used in the determination or prediction. In an embodiment, the determination or prediction is done without using any characteristic of the one or more patterns. This determination may be simply comparing the values of the one or more processing parameters and the OPW of the one or more patterns—if the values fall within the OPW, no defect exists; if the values fall outside the OPW, at least one defect is expected to exist. This determination may also be done using a suitable empirical model (including a statistical model). For example, a classification model may be used to provide a probability of existence of a defect. Another way to make this determination is to use a computational model to simulate an image, or expected patterning contours, that the one or more patterns produce under the values of the one or more processing parameters and evaluate (e.g., measure) one or more image or contour parameters. In an embodiment, the one or more processing parameters may be determined immediately (e.g., before processing the one or more patterns or a next substrate) after processing the one or more patterns or a substrate. The determined existence and/or characteristic of a defect may serve as a basis for a decision of whether to inspect the one or more patterns. In an embodiment, the values of the one or more processing parameters may be used to calculate a moving average of the one or more lithographic parameters. A moving average is useful to capture long term drift of the one or more lithographic parameters, without distraction by short term fluctuation.

In optional step 293, the one or more patterns are inspected if the determined or predicted existence, probability of existence, characteristic, and/or a combination selected from the foregoing, meets one or more criteria (e.g., probability is above a threshold).

Figure 3:
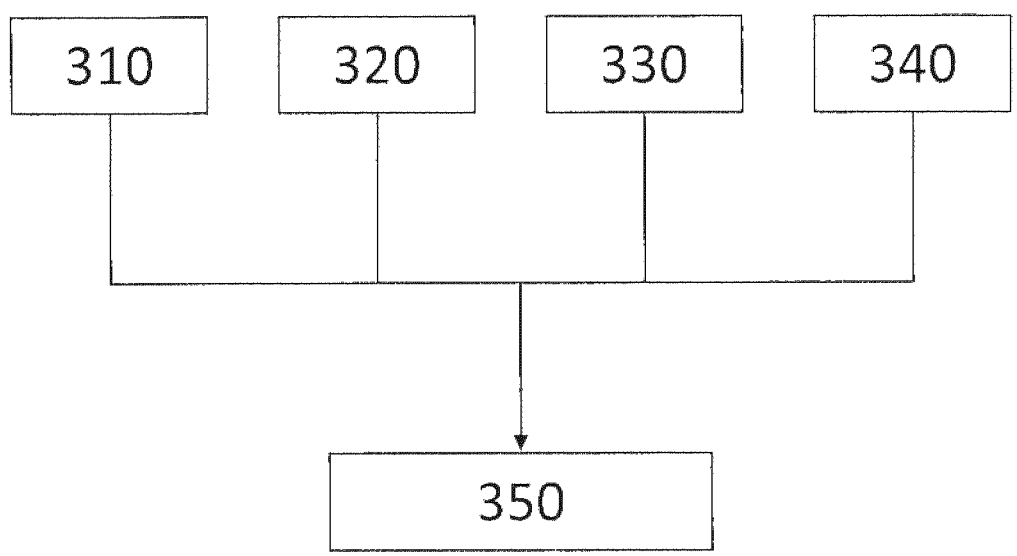
FIG. 3 shows exemplary sources of the one or more processing parameters.

FIG. 3 shows exemplary sources of the one or more processing parameters 350. One source may be data 310 of the processing apparatus, such as a parameter of the illumination system, projection optics, substrate stage, etc. of a lithography apparatus. Another source may be data 320 from one or more substrate metrology tools, such as a substrate height map/data, a focus map/data, critical dimension uniformity (CDU) map/data, etc. Data 320 may be obtained before a substrate is subject to a step (e.g., etch) that prevents reworking of the substrate. Another source may be data 330 from one or more patterning device metrology tools, such as a patterning device (e.g., mask) CDU map/data, a patterning device (e.g., mask) film stack parameter variation, etc. Yet another source may be data 340 from an operator of the processing apparatus.

Figure 4A:
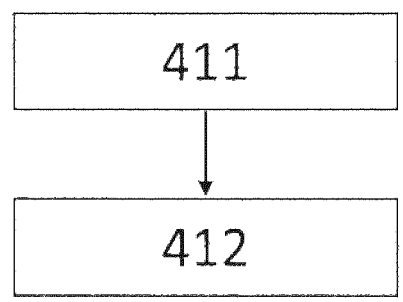
FIG. 4A shows an implementation of step 292 of FIG. 2.

FIG. 4A shows an implementation of step 292 of FIG. 2. In step 411, the OPW of the one or more patterns is obtained, either by using a model or by querying a database. For example, the OPW may be a space spanned by processing parameters such as focus and dose. In step 412, the values of the one or more processing parameters determined in step 291 of FIG. 2 are compared with the OPW. If the values of the one or more processing parameters fall within the OPW, no defect exists; if the values of the one or more processing parameters fall outside the OPW, at least one defect is expected to exist.

Figure 4B:
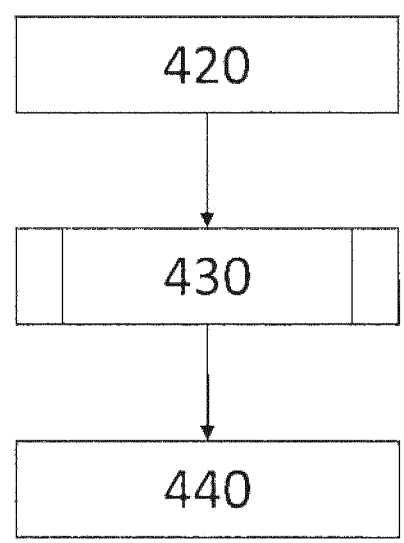
FIG. 4B shows a further implementation of step 292 of FIG. 2.

FIG. 4B shows a further implementation of step 292 of FIG. 2. The one or more processing parameters 420 may be used as input (e.g., an independent variable) to a classification model 430. The one or more processing parameters 420 may include a characteristic of the illumination (e.g., intensity, pupil profile, etc.), a characteristic of the projection optics, dose, focus, a characteristic of the resist, a characteristic of development and/or post-exposure baking of the resist, and/or a characteristic of etching. The term "classifier" or "classification model" sometimes also refers to a mathematical function, implemented by a classification algorithm, which maps input data to a category. In machine learning and statistics, classification is the problem of identifying to which of a set of categories 440 (sub-populations) a new observation belongs, on the basis of a training set of data containing observations (or instances) whose category membership is known. The individual observations are analyzed into a set of quantifiable properties, known as various explanatory variables, features, etc. These properties may variously be categorical (e.g. "good"—a lithographic process that does not produce a defect or "bad"—a lithographic process that produces a defect; "type 1", "type 2", ... "type n"—different types of defects). Classification is considered an instance of supervised learning, i.e. learning where a training set of correctly identified observations is available. Examples of classification models are logistic regression, multinomial logit, probit regression, the perceptron algorithm, support vector machine, import vector machine, and/or linear discriminant analysis.

Figure 5:
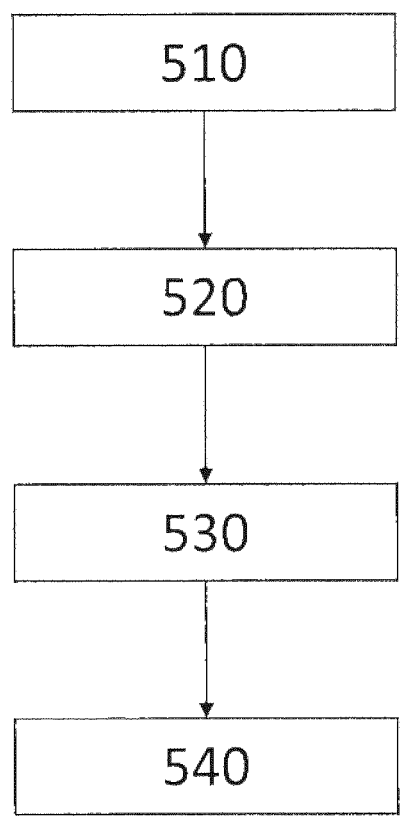
FIG. 5 shows an exemplary flow that uses the method of FIG. 2.

FIG. 5 shows an exemplary flow that uses the method of FIG. 2. In step 510, step 291 is carried out on one or more patterns produced onto a portion, or an entirety, of a substrate, where, in this example, the values of the one or more processing parameters are determined by using one or more metrology tools on the patterning device and/or the substrate, and by obtaining (e.g., measuring) values of one or more parameters of the device manufacturing process or equipment (e.g., a lithographic apparatus). In step 520, step 292 is carried out, where, in this example, if the values of the one or more processing parameters for the one or more patterns are beyond one or more thresholds, at least one defect produced by the one or more patterns is expected to exist. In step 530, an area that encloses the one or more patterns that is expected to produce at least one defect ("a location of interest (LOI)") is identified. A LOI may also enclose one or more patterns that are not expected to produce at least one defect. The one or more LOIs may be compiled as a map and presented to a user. In step 540, the one or more patterns in the one or more LOIs are inspected.

Figure 6:
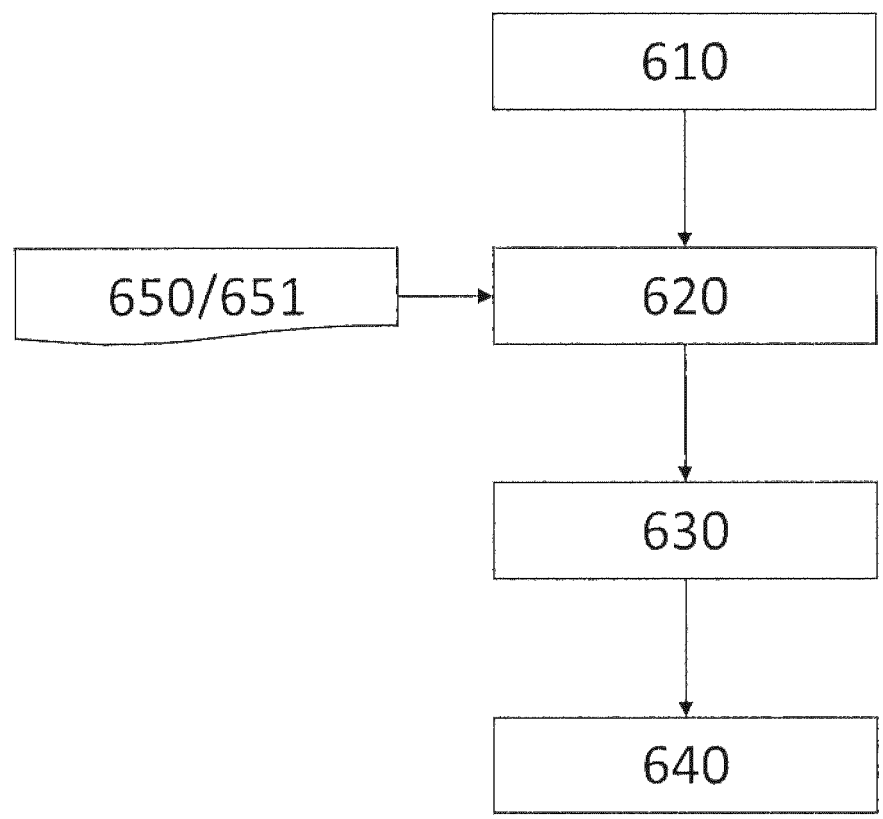
FIG. 6 shows another exemplary flow that uses the method of FIG. 2.

FIG. 6 shows another exemplary flow that uses the method of FIG. 2. In step 610, step 291 is carried out on one or more patterns produced onto a portion, or an entirety, of a substrate, where, in this example, the values of the one or more processing parameters are determined by using one or more metrology tools on the patterning device and/or the substrate, and by obtaining (e.g., measuring) values of one or more parameters of the device manufacturing process or equipment (e.g., a lithographic apparatus). In step 620, step 292 is carried out, where, in this example, if the values of the one or more processing parameters for the one or more patterns are beyond an OPW 650 of the one or more patterns or an OPW 651 of all the patterns, at least one defect produced by the one or more patterns is expected to exist. In step 630, an area ("a location of interest (LOI)") that encloses the one or more patterns that is expected to produce at least one defect is identified. A LOI may also enclose one or more patterns that are not expected to produce at least one defect. The one or more LOIs may be compiled as a map and presented to a user. In step 640, the one or more patterns in the one or more LOIs are inspected.

In an embodiment, a computer-implemented defect prediction method for a device manufacturing process may include: determining values of one or more processing parameters under which one or more patterns are processed onto an area of a substrate; and determining or predicting, using the values of the one or more processing parameters, existence, probability of existence, a characteristic, and/or a combination selected from the foregoing, of a defect in the area, produced from the one or more patterns with the device manufacturing process. Determining or predicting the existence, probability of existence, characteristic, and/or combination selected from the foregoing, may be done by comparing a process window of the one or more patterns with the values of the one or more processing parameters. The method may further include inspecting the area if the determined or predicted existence, probability of existence, characteristic, and/or combination selected from the foregoing, meets one or more criteria. The one or more criteria may comprise that the values of the one or more processing parameters fall outside of a process window of the one or more patterns.

In an embodiment, a device for selecting areas to be inspected on a substrate may obtain values of one or more processing parameters under which one or more patterns are processed onto an area of the substrate, select an area for inspection, if existence, probability of existence, a characteristic, and/or a combination selected from the foregoing, of a defect, in the area, produced from the one or more patterns, meets one or more criteria. The existence, probability of existence, characteristic, and/or combination selected from the foregoing may be determined or predicted using the values of the one or more processing parameters. The device may export a file including a data structure representing the area.

A substrate inspection tool may inspect patterns processed onto the substrate. The substrate inspection tool may obtain a file including a data structure representing an area (instead of, or in addition to, specific locations) to be inspected on the substrate. The substrate inspection tool may inspect the area.

In an embodiment, a computer-implemented defect prediction method for a device manufacturing process involving processing one or more patterns onto a substrate, the method comprising: determining values of one or more processing parameters across the substrate, and identifying one or more areas, utilizing the values of the one or more processing parameters, as being one or more areas to inspect.

The one or more processing parameters may be one or more global processing parameters. The one or more areas may be identified without using any characteristic of the one or more patterns.

The one or more areas identified may have increased probability of existence of a defect produced with the device manufacturing process (e.g., with higher probability than another part (e.g., the rest) of the substrate).

Figure 7:
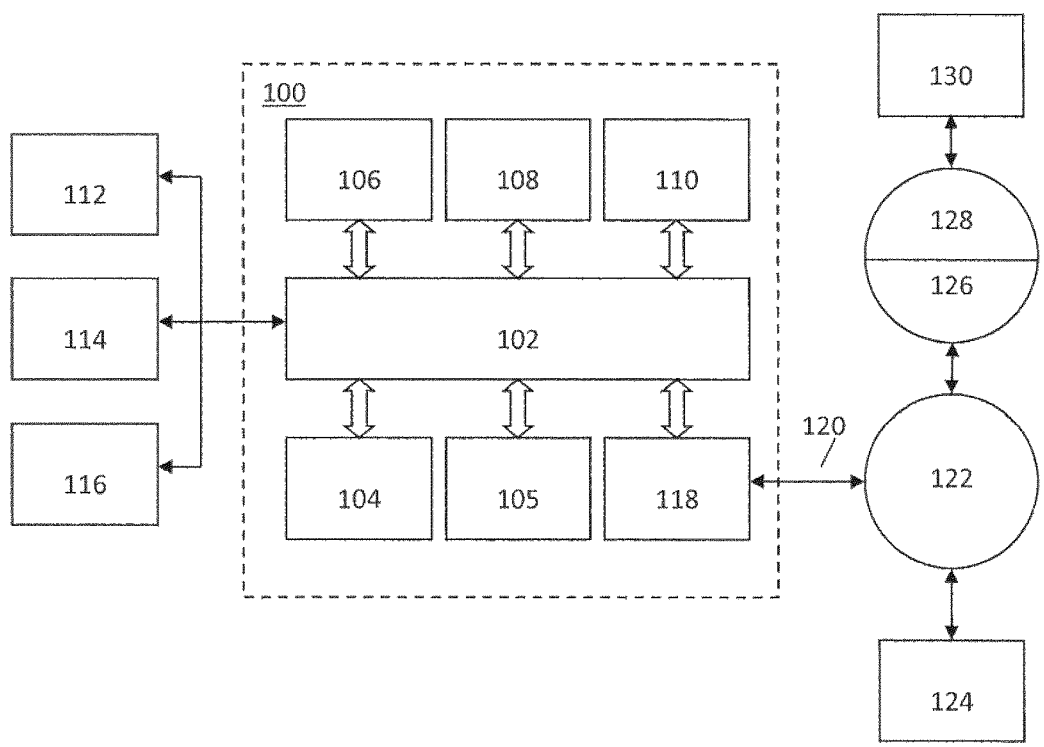
FIG. 7 is a block diagram of an example computer system in which embodiments can be implemented.

FIG. 7 is a block diagram that illustrates a computer system 100 which can assist in implementing the methods and flows disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions or all of a process described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with one or more embodiments, one such downloaded application provides for the process of an embodiment described herein, for example. The received code may be executed by processor 104 as it is received, and/or stored in storage device 110, or other non-volatile storage for later execution. In this manner, computer system 100 may obtain application code in the form of a carrier wave.

Figure 8:
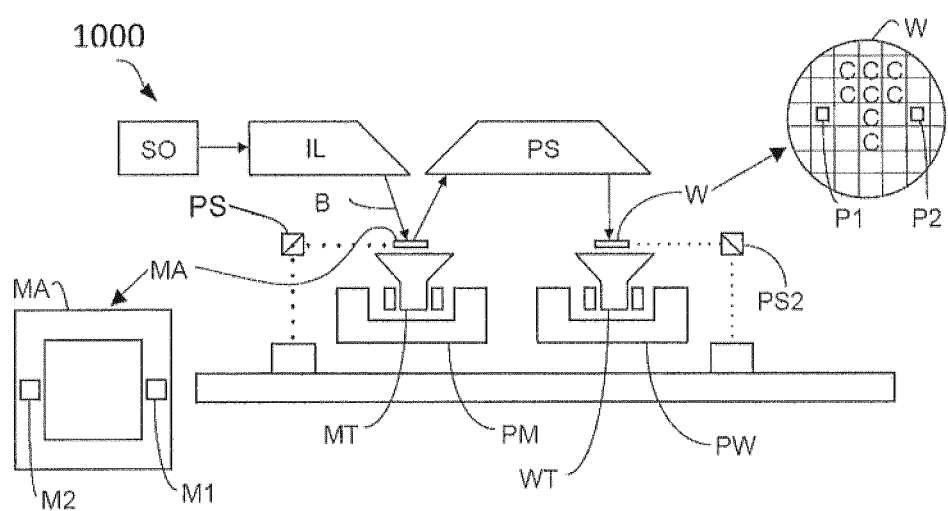
FIG. 8 is a schematic diagram of another lithographic apparatus.

FIG. 8 schematically depicts another exemplary lithographic apparatus 1000 utilizing the methods described herein or to which the methods may be applied. The lithographic apparatus 1000 includes:

a source collector module SO an illumination system (illuminator) IL configured to condition a radiation beam B (e.g. EUV radiation).

a support structure (e.g. a patterning device table) MT constructed to support a patterning device (e.g. a mask or a reticle) MA and connected to a first positioner PM configured to accurately position the patterning device;

a substrate table (e.g. a substrate table) WT constructed to hold a substrate (e.g. a resist coated wafer) W and connected to a second positioner PW configured to accurately position the substrate; and a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective mask). It is to be noted that because most materials are absorptive within the EUV wavelength range, the mask may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 8, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 8, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., mask table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 could be used in at least one of the following modes:

1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-)magnification and image reversal characteristics of the projection system PS.

3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 9:
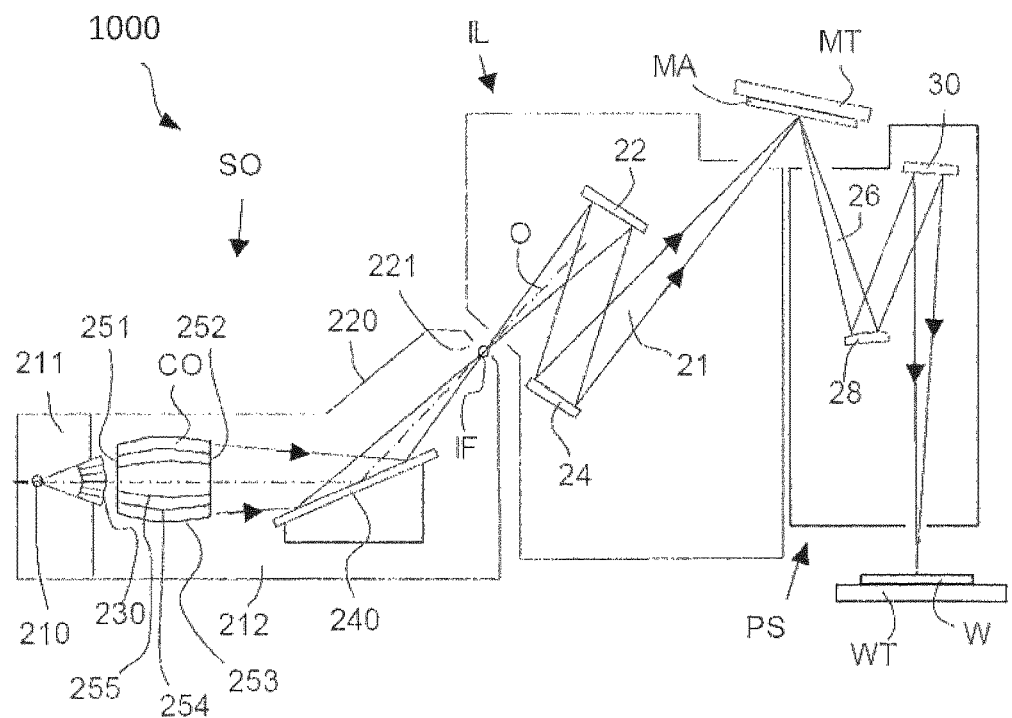
FIG. 9 is a more detailed view of the apparatus in FIG. 8.

FIG. 9 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing an at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 9.

Collector optic CO, as illustrated in FIG. 9, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type is preferably used in combination with a discharge produced plasma source, often called a DPP source.

Figure 10:
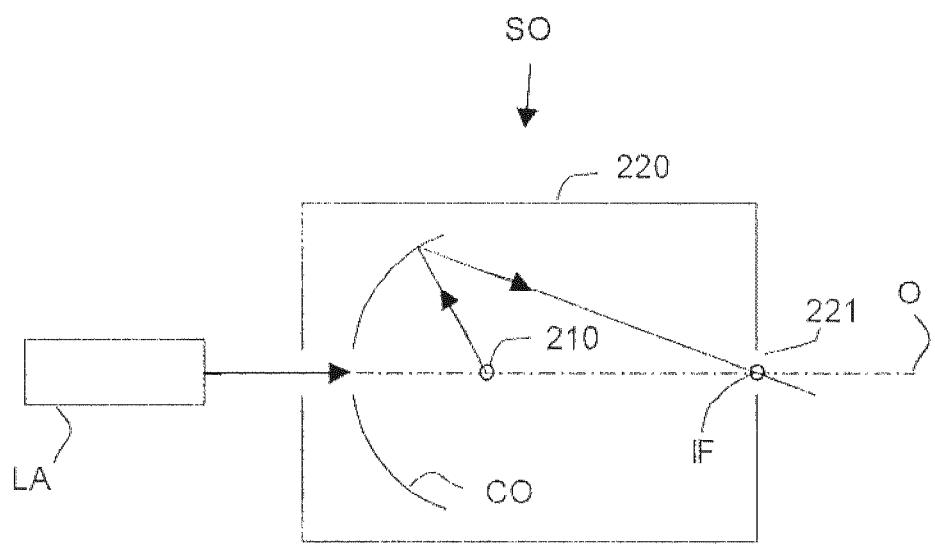
FIG. 10 is a more detailed view of the source collector module SO of the apparatus of FIG. 8 and FIG. 9.

Alternatively, the source collector module SO may be part of an LPP radiation system as shown in FIG. 10. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The concepts disclosed herein may simulate or mathematically model any generic imaging system for imaging sub wavelength features, and may be especially useful with emerging imaging technologies capable of producing wavelengths of an increasingly smaller size. Emerging technologies already in use include EUV (extreme ultra violet) lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The invention may further be described using the following clauses:

1. A computer-implemented defect prediction method for a device manufacturing process involving processing one or more patterns onto a substrate, the method comprising: determining values of one or more processing parameters under which the one or more patterns are processed; and
determining or predicting, using the values of the one or more processing parameters, existence, probability of existence, a characteristic, and/or a combination selected from the foregoing, of a defect resulting from production of the one or more patterns with the device manufacturing process.
2. The method of clause 1, further comprising inspecting the one or more patterns if the determined or predicted existence, probability of existence, characteristic, and/or a combination selected from the foregoing, meets one or more criteria.
3. The method of clause 1 or clause 2, further comprising identifying one or more areas that enclose the one or more patterns if the determined or predicted existence, probability of existence, characteristic, and/or combination selected from the foregoing, meets one or more criteria.
4. The method of any of clauses 1 to 3, wherein the determining or predicting the existence, probability of existence, characteristic, and/or combination selected from the foregoing, further uses a characteristic of the one or more patterns.
5. The method of any of clauses 1 to 4, wherein the one or more patterns comprise a process window limiting pattern.
6. The method of any of clauses 1 to 5, wherein determining or predicting the existence, probability of existence, characteristic, and/or combination selected from the foregoing comprises comparing the values of the one or more processing parameters with an overlapping process window of the one or more patterns.
7. The method of any of clauses 1 to 5, wherein determining or predicting the existence, probability of existence, characteristic, and/or combination selected from the foregoing comprises determining whether the values of the one or more processing parameters are beyond one or more thresholds.
8. The method of any of clauses 1 to 5, wherein determining or predicting the existence, probability of existence, characteristic, and/or combination selected from the foregoing comprises using a classification model with the values of the one or more processing parameters as input to the classification model.
9. The method of clause 8, wherein the classification model is one or more selected from the following: logistic regression, multinomial logit, probit regression, the perceptron algorithm, support vector machine, import vector machine, and/or linear discriminant analysis.
10. The method of any of clauses 1 to 5, wherein determining or predicting the existence, probability of existence, characteristic, and/or combination selected from the foregoing, of the defect comprises simulating an image, or expected patterning contours, of the one or more patterns under the values of the one or more processing parameters and determining an image or contour parameter.
11. The method of any of clauses 1 to 10, wherein the one or more patterns are identified using an empirical model or a computational model.
12. The method of any of clauses 1 to 11, wherein the one or more processing parameters are selected from: focus, depth of focus, focus error, dose, an illumination parameter, a projection optics parameter, data obtained from metrology, and/or data from an operator of a processing apparatus used in the device manufacturing process.
13. The method of any of clauses 1 to 12, wherein the values of the one or more processing parameters are obtained from metrology.
14. The method of any of clauses 1 to 13, wherein the one or more processing parameters are determined or predicted using a model or by querying a database.
15. The method of any of clauses 1 to 14, wherein the device manufacturing process comprises using a lithography apparatus.
16. The method of any of clauses 1 to 15, wherein the device manufacturing process comprises etching the substrate.
17. The method of any of clauses 1 to 16, wherein the values of the one or more processing parameters are determined, before, immediately before or during the one or more patterns are processed.
18. The method of any of clauses 1 to 17, wherein the one or more processing parameters comprise one or more local processing parameters, one or more global processing parameters, and/or a combination selected from the foregoing.
19. The method of any of clauses 1 to 18, wherein the defect is undetectable before the substrate is irreversibly processed.
20. The method of any of clauses 1 to 19, wherein the defect is one or more selected from: necking, line pull back, line thinning, critical dimension error, overlapping, resist top loss, resist undercut and/or bridging.
21. The method of any of clause 1 to 20, wherein the one or more patterns comprise process window limiting patterns (PWLPs).
22. A computer-implemented defect prediction method for a device manufacturing process, the method comprising:
determining values of one or more processing parameters under which one or more patterns are processed onto an area of a substrate; and
determining or predicting, using the values of the one or more processing parameters, existence, probability of existence, a characteristic, and/or a combination selected from the foregoing, of a defect, in the area, resulting from production of the one or more patterns with the device manufacturing process.
23. The method of clause 22, wherein determining or predicting the existence, probability of existence, characteristic, and/or a combination selected from the foregoing, comprises comparing a process window of the one or more patterns with the values of the one or more processing parameters.

24. The method of clause 22 or clause 23, further comprising inspecting the area if the determined or predicted existence, probability of existence, characteristic, and/or combination selected from the foregoing, meets one or more criteria.

25. The method of clause 24, wherein the one or more criteria comprise that the values of the one or more processing parameters fall outside of a process window of the one or more patterns.

26. A computer-implemented defect prediction method for a device manufacturing process involving processing one or more patterns onto a substrate, the method comprising:
determining values across the substrate of one or more processing parameters of the device manufacturing process under which one or more patterns are processed onto the substrate, and
identifying one or more areas, utilizing the values of the one or more processing parameters, as having, or having increased probability of existence of, a defect resulting from production with the device manufacturing process.

27. The method of clause 26, wherein the identifying comprises:
comparing a process window associated with the one or more patterns located at the identified one or more areas with the values of the one or more processing parameters at the identified one or more areas, and
determining or predicting, using the comparison, existence, probability of existence, a characteristic, or a combination thereof, of a defect produced from the one or more patterns at the identified one or more areas with the device manufacturing process.

28. A computer-implemented defect prediction method for a device manufacturing process, the method comprising:
determining values of one or more processing parameters under which one or more patterns are processed onto an area of a substrate; and
determining or predicting, using the values of the one or more processing parameters, a sub-area of the substrate at which a defect exists, or has an increased probability of existing, resulting from production of the one or more patterns with the device manufacturing process.

29. A device for selecting areas to be inspected on a substrate,
the device configured to obtain values of one or more processing parameters under which one or more patterns are processed onto an area of the substrate; and
the device configured to select an area for inspection, if existence, probability of existence, a characteristic, and/or a combination selected from the foregoing, of a defect in the area resulting from production of the one or more patterns, meets one or more criteria,
wherein the existence, probability of existence, characteristic, and/or combination selected from the foregoing, is determined or predicted using the values of the one or more processing parameters.

30. The device of clause 29, wherein the device is further configured to export a file including a data structure representing the area.

31. A substrate inspection tool configured to inspect patterns processed onto a substrate, wherein the substrate inspection tool is configured to obtain a file including a data structure representing an area comprising the patterns to be inspected on the substrate, wherein the substrate inspection tool is configured to inspect the area.

32. A computer-implemented defect prediction method for a device manufacturing process involving processing one or more patterns onto a substrate, the method comprising:
determining values of one or more processing parameters across the substrate, and
identifying one or more areas, utilizing the values of the one or more processing parameters, for inspection.

33. The method of clause 32, wherein the one or more processing parameters are one or more global processing parameters.

34. The method of any clause 32 or clause 33, wherein the one or more areas are identified without using any characteristic of the one or more patterns.

35. The method any of clauses 32 to 34, wherein the one or more areas identified have higher probability of existence of a defect produced with the device manufacturing process than another part of the substrate.

36. The method of any of clauses 32 to 35, further comprising inspecting the one or more areas.

37. The method of any of clauses 32 to 36, further comprising exporting a file including a data structure representing the one or more areas.

38. The method of any of clauses 32 to 37, wherein the one or more processing parameters are selected from: focus, depth of focus, focus error, dose, an illumination parameter, a projection optics parameter, data obtained from metrology, and/or data from an operator of a processing apparatus used in the device manufacturing process.

39. The method of any of clauses 32 to 38, wherein the values of the one or more processing parameters are obtained from metrology.

40. The method of any of clauses 32 to 39, wherein the one or more processing parameters are determined or predicted using a model or by querying a database.

41. The method of any of clauses 32 to 40, wherein the device manufacturing process comprises using a lithography apparatus.

42. The method of any of clauses 32 to 41, wherein the device manufacturing process comprises etching the substrate.

43. A computer program product comprising a computer readable medium having instructions recorded thereon, the instructions when executed by a computer implementing the method of any of clauses 1 to 28 or 32 to 42.

Aspects of the invention can be implemented in any convenient form. For example, an embodiment may be implemented by one or more appropriate computer programs which may be carried on an appropriate carrier medium which may be a tangible carrier medium (e.g. a disk) or an intangible carrier medium (e.g. a communications signal). Embodiments of the invention may be implemented using suitable apparatus which may specifically take the form of a programmable computer running a computer program arranged to implement a method as described herein.

The descriptions above are intended to be illustrative, not limiting. Thus, it will be apparent to one skilled in the art that modifications may be made to the embodiments as described without departing from the scope of the claims set out below.

What is claimed is:

1. A defect prediction method for a device manufacturing process involving processing one or more patterns onto a substrate, the defect prediction method comprising:
determining values of one or more processing parameters under which the one or more patterns are processed;
determining or predicting, by a hardware computer system using the values of the one or more processing parameters, an existence, a probability of existence, a characteristic, and/or a combination selected from the foregoing, of a defect resulting from production of the one or more patterns with the device manufacturing process; and generating electronic data representing one or more sub-areas of a surface of the substrate for inspection by a physical inspection apparatus, the one or more sub-areas enclose the one or more patterns for which the determined or predicted existence, probability of existence, characteristic, and/or combination selected from the foregoing, meets one or more criteria and enclose one or more other patterns not identified as prone to produce a defect.

2. The method of claim 1, further comprising inspecting the one or more patterns responsive to the determined or predicted existence, probability of existence, characteristic, and/or combination selected from the foregoing, meeting one or more criteria.

3. The method of claim 1, wherein the determining or predicting the existence, probability of existence, characteristic, and/or combination selected from the foregoing, of the defect further uses a characteristic of the one or more patterns.

4. The method of claim 1, wherein the one or more patterns comprise a process window limiting pattern.

5. The method of claim 1, wherein the determining or predicting the existence, probability of existence, characteristic, and/or combination selected from the foregoing, of the defect comprises:
comparing the values of the one or more processing parameters with an overlapping process window of the one or more patterns, or
determining whether the values of the one or more processing parameters are beyond one or more thresholds, or
using a classification model with the values of the one or more processing parameters as input to the classification model.

6. The method of claim 1, wherein the determining or predicting the existence, probability of existence, characteristic, and/or combination selected from the foregoing, of the defect comprises simulating an image, or expected patterning contour, of the one or more patterns under the values of the one or more processing parameters and determining an image or contour parameter.

7. The method of claim 1, wherein the one or more patterns are identified using an empirical model or a computational model.

8. The method of claim 1, wherein the one or more processing parameters are selected from: focus, depth of focus, focus error, dose, an illumination parameter, a projection optics parameter, data obtained from metrology, and/or data from an operator of a processing apparatus used in the device manufacturing process.

9. The method of claim 1, wherein the values of the one or more processing parameters are obtained from metrology.

10. The method of claim 1, wherein the one or more processing parameters are determined or predicted using a model or by querying a database.

11. The method of claim 1, wherein the one or more processing parameters comprise one or more local processing parameters, one or more global processing parameters, and/or a combination selected from the foregoing.

12. The method of claim 1, wherein the defect is undetectable before the substrate is irreversibly processed.

13. A device for selecting areas to be inspected on a substrate,
the device configured to obtain values of one or more processing parameters under which one or more patterns are processed onto an area of the substrate; and
the device configured to select a sub-area of a surface of the substrate for inspection by a physical inspection apparatus, responsive to an existence, a probability of existence, a characteristic, and/or a combination selected from the foregoing, of a defect in the area resulting from production of the one or more patterns, meets one or more criteria and generate electronic data representing the sub-area, for use by an apparatus to enable the inspection,
wherein the existence, probability of existence, characteristic, and/or combination selected from the foregoing, is determined or predicted using the values of the one or more processing parameters, and
wherein the sub-area for inspection includes a pattern prone to produce a defect and a pattern not identified as prone to produce a defect.

14. The device of claim 13, wherein the device is further configured to export a file including a data structure representing the sub-area.

15. The device of claim 13, wherein the device is further configured to cause inspection of the one or more patterns responsive to the determined or predicted existence, probability of existence, characteristic, and/or combination selected from the foregoing, meeting one or more criteria.

16. The device of claim 13, wherein the determination or prediction of the existence, probability of existence, characteristic, and/or combination selected from the foregoing, of the defect further uses a characteristic of the one or more patterns.

17. The device of claim 13, wherein the one or more patterns comprise a process window limiting pattern.

18. A method for a device manufacturing process involving processing one or more patterns onto a substrate, the method comprising:
determining values across the substrate of one or more processing parameters of the device manufacturing process under which one or more patterns are processed onto the substrate;
identifying one or more sub-areas of a surface of the substrate for inspection by a physical inspection apparatus, by a hardware computer system utilizing the values of the one or more processing parameters, as having, or having increased probability of existence of, a defect resulting from production with the device manufacturing process, wherein the one or more sub-areas for inspection includes a pattern prone to produce a defect and a pattern not identified as prone to produce a defect; and
generating electronic data representing the one or more sub-areas, for use by an apparatus to enable the inspection.

19. The method of claim 18, wherein the identifying comprises:
comparing a process window associated with the one or more patterns located at the identified one or more sub-areas with the values of the one or more processing parameters at the identified one or more sub-areas, and
determining or predicting, using the comparison, an existence, a probability of existence, a characteristic, or a combination thereof, of a defect produced from the one or more patterns at the identified one or more sub-areas with the device manufacturing process.

20. The method of claim 18, further comprising inspecting the one or more sub-areas based on the electronic data.

* * * * *